(12) United States Patent
Gleason (10) Patent No.: US 6,912,750 B2
(45) Date of Patent: Jul. 5, 2005

(54) DOCK LEVELER WITH DUAL FUNCTION HYDRAULIC MECHANISM

(75) Inventor: Denis Gleason, Bowmanville (CA)

(73) Assignee: Nordock Inc., (CA)

( * ) Notice: Subject to any disclaimer, the term of this patent is extended or adjusted under 35 U.S.C. 154(b) by 0 days.

(21) Appl. No.: 10/647,579

(22) Filed: Aug. 26, 2003

(65) Prior Publication Data

US 2005/0044645 A1 Mar. 3, 2005

(51) Int. Cl.[7] .............................................. E01D 1/00
(52) U.S. Cl. ........................................ 14/71.3; 14/71.1
(58) Field of Search .............................. 14/69.5, 71.1, 14/71.3, 71.5, 71.7

(56) References Cited

U.S. PATENT DOCUMENTS

| | | | | |
|---|---|---|---|---|
| 4,091,488 A | * | 5/1978 | Artzberger | 14/71.7 |
| 5,440,772 A | * | 8/1995 | Springer et al. | 14/69.5 |
| 5,553,343 A | * | 9/1996 | Alexander | 14/71.1 |
| 5,832,554 A | * | 11/1998 | Alexander | 14/71.1 |
| 6,487,741 B2 | * | 12/2002 | Alexander | 14/71.3 |
| 6,769,149 B2 | * | 8/2004 | Alexander | 14/71.3 |

* cited by examiner

Primary Examiner—Thomas B. Will
Assistant Examiner—Alexandra Pechhold
(74) Attorney, Agent, or Firm—Andrus, Sceales, Starke & Sawall, LLP (57) ABSTRACT

A hydraulically operated dock leveler having a single cylinder that raises the ramp and extends the lip. The leveler includes a ramp assembly that is hinged at its rear edge to a supporting structure and a lip that is hinged to the forward edge and can be pivoted between a downwardly hanging pendant position and an extended position. A lip extension crank is attached to the forward hinge and a hydraulic cylinder is interposed between the crank and the supporting structure. The hydraulic system includes a pump to provide fluid to the cylinder at the desired pressure to raise the ramp and extend the lip. By operating the cylinder, the ramp assembly rises from a horizontal cross traffic position to an upwardly inclined position. As the ramp nears the top of its inclined position the extension crank is actuated downward allowing the hydraulic cylinder to rotate the crank about the hinge and extend the lip. When operation of the pump is discontinued, the ramp will descend until the lip engages the bed of a truck. When the system pressure is dissipated the crank will retract allowing the lip to fall free and pendant when the cylinder is operated to store the dock leveler.

16 Claims, 10 Drawing Sheets

DOCK LEVELER WITH DUAL FUNCTION HYDRAULIC MECHANISM

BACKGROUND OF THE INVENTION

Dock levelers are utilized in the transfer of goods from a building to and from a trailer by bridging the gap from the building floor to the trailer bed. Dock levelers include a frame or support structure for mounting the leveler in a pit of a loading dock. The rear end of a conventional dock leveler is hinged to the building floor. The opposite end has an extendable lip plate that pivots out and onto the trailer bed. Levelers are adapted to move from a generally horizontal position where the upper surface of the ramp is flush with the surface of the building floor to a second generally inclined position to provide a ramp between the bed of the truck and the dock floor.

In a conventional hydraulically operated dock leveler a cylinder interconnects the frame and the ramp, and acts to pivot the ramp from a horizontal dock level position to the upwardly inclined position. In addition, a second cylinder interconnects the ramp and the lip and pivots the lip from the downward pendant position to the outwardly extended position when the ramp is fully raised. The lip cylinder can alternatively be substituted with a mechanical linkage interconnecting the frame to an actuator on the ramp to extend the lip as the ramp is near its upper most inclined position. An electric motor that when actuated drives a pump providing the necessary hydraulic flow and pressure. The operator typically pushes and holds a control button until the ramp fully raises and the lip extends. Releasing the button allows the ramp to lower by gravity until the lip contacts the bed of the truck where hydraulic pressure is released and the truck holds the weight of the leveler. After loading the operator pushes the control button raising the ramp until the lip retracts pendent and releasing the button allows the dock leveler to store level with the building floor.

U.S. Pat. Nos. 4,365,374 and 4,641,388 pertain to hydraulically operated dock levelers and U.S. Pat. No. 5,088,143 pertains to a mechanical lip actuation. Other other hydraulically operated dock levelers are shown and described in U.S. Pat. Nos. 4,110,860; 4,920,598 and 4,955,923.

The two conventional hydraulic dock leveler designs each have advantages and disadvantages. The dock leveler with a separate lip extension cylinder can be efficient but is more costly to purchase and service mostly due to expensive and micro machined parts, valves, and additional hydraulic hose and fittings. It is also dependent on the correct functioning of a sequencing valve for the lip to extend and retract. This sequencing valve can come out of adjustment or get contaminated causing it to malfunction and not extend or retract the lip. A further disadvantage of a hydraulic lip cylinder is that it causes resistance to the retraction of the lip especially as the dock leveler ages and the lip hinge rusts. The mechanical lip counterpart is less costly but requires a latching and de-latching mechanism that has many parts that wear requiring regular maintenance and repair. If the mechanical latch does not release the dock cannot be stored and the mechanism can be destroyed from impact of an incoming trailer.

BRIEF DESCRIPTION OF THE INVENTION

It is a general object of the present invention to provide an improved hydraulically actuated dock leveler having a single cylinder, which both raises the ramp assembly and extends the lip assembly.

It is another object of the invention to have an extension crank assembly that actuates the lip and then disengages to allow the cylinder to finalize the lip extension. The extension crank is rotational around the forward hinge with the initial actuation by a chain or the like from the frame or pit floor.

It is another object of the invention that when operation of the pump is discontinued, the ramp will descend until the lip engages the bed of a truck. With the support of the ramp removed from the cylinder and the system pressure removed the cylinder and crank assembly shall retract to its original position. Thus, allowing the lip, when the truck support is removed or if the system pressure is resumed, to fall free and pendant.

It is another object of the invention to eliminate the shortcomings of conventional designs by reducing cost by providing a simpler more cost effective lip extension without the use of a second hydraulic cylinder, other costly components and encumbrances.

In accordance with the invention, a dock leveler is provided with a frame secured in a pit of a loading dock, a ramp assembly mounted to the frame for pivotal movement, and a lip assembly hingedly connected to the front edge portion of the ramp. A hydraulic cylinder is interposed between the frame and a crank assembly that is hingedly connected to the front hinge. A hydraulic pump when operated provides fluid to the cylinder at the required pressure to raise the ramp assembly from a stored substantially horizontal position to an inclined position relative to a parked vehicle. The hydraulic cylinder is positioned so that the crank assembly rotates towards the ramp and will raise the ramp between a substantially horizontal position to an inclined position relative to a parked vehicle. A chain is connected between the crank assembly and the frame that remains inoperative until the ramp assembly is raised to near maximum inclined position. A spring is connected to the crank assembly and to the underside of the ramp assembly to bias the cylinder and crank to the ramp lift position. As the ramp assembly nears the upper most inclined position the crank assembly is actuated by the chain, initiating the cylinder to change direction and rotate the crank in the opposite direction, extending the lip assembly outward. When the operation of the pump is discontinued the weight of the lip and ramp retract the cylinder and the ramp descends until the lip contacts the bed of a vehicle. The system pressure is caused to be removed when the weight of the ramp and lip are supported by the truck bed allowing the spring to return the cylinder and crank to the ramp lift position. Upon reactivating the pump unit the ramp assembly will raise and the lip assembly will retract to its free and pendant position. Discontinuing the pump after the lip assembly retracts allows the dock leveler to descend to its stored position.

DESCRIPTION OF THE PREFERRED EMBODIMENTS

While this invention is susceptible of embodiment in many different forms, the drawings show and the specification describes in detail a preferred embodiment of the invention. It should be understood that the drawings and specification are to be considered an exemplification of the principles of the invention. They are not intended to limit the broad aspects of the invention to the embodiment illustrated.

Figure 1:
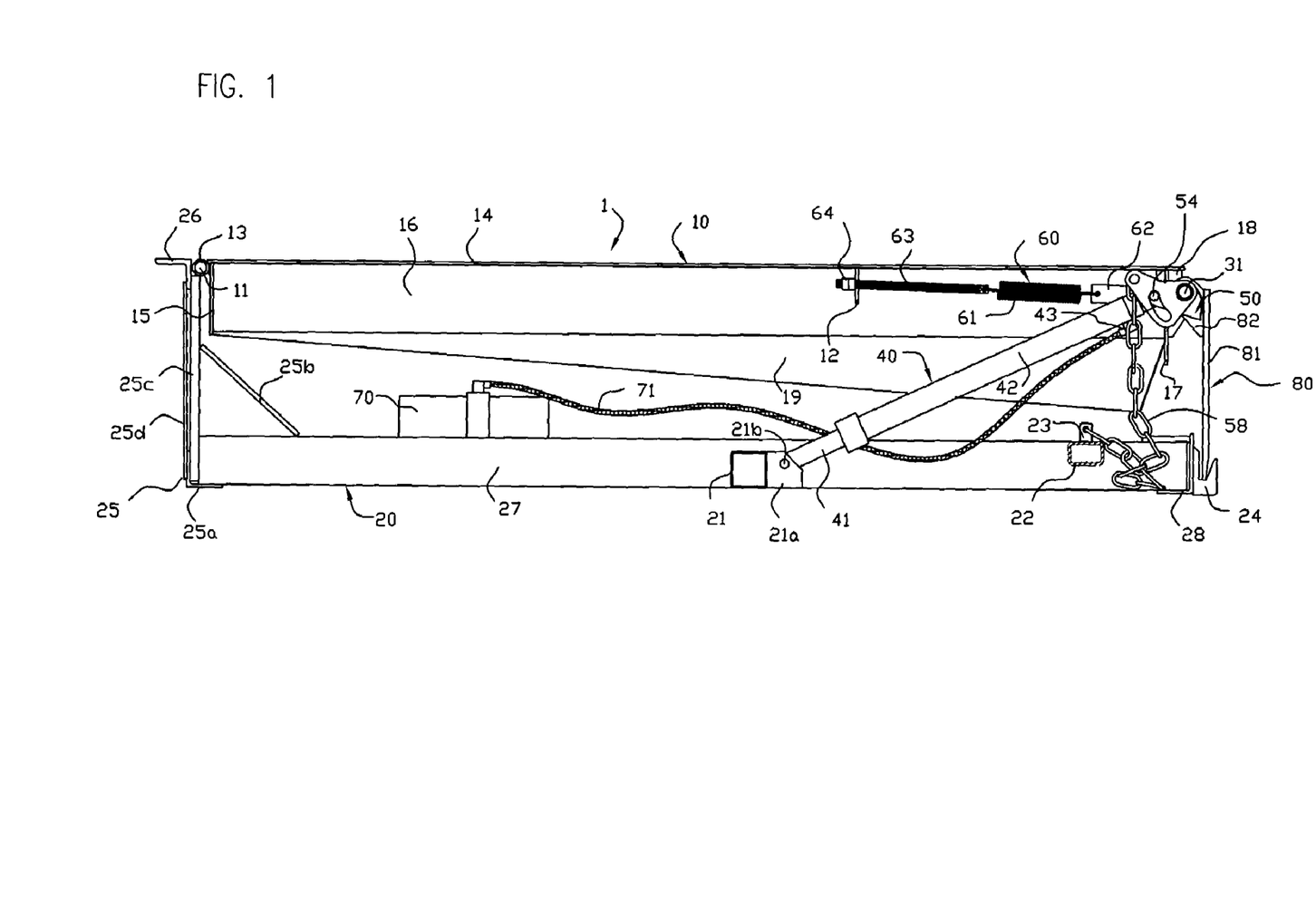
FIG. 1 is a side sectional view of the dock leveler in its parked position and showing the supporting frame, the ramp assembly, the lip assembly, the hydraulic cylinder, the motor pump unit and the actuator mechanism.

Referring to FIG. 1 a preferred embodiment of the improved dock leveler assembly 1 is shown in the stored or parked position within a pit, not shown, of conventional design formed in a loading dock and having an open top and an open side adjacent the front wall of the dock. The assembly has a variety of components including a supporting frame 20, a ramp assembly 10, a hydraulic cylinder 40, a motor pump assembly 70, an extendable lip assembly 80, and a lip actuator assembly 50.

The supporting frame 20 is comprised of horizontal extending base members 27 together with a vertical frame 25 and a hinge angle 26. The hinge angle 26 of the frame is securely anchored to the pit floor and pivotally mounted to the ramp assembly 10 by means of a hinge pin 11 and hinge tubes 13. The base members 27 span the length of the assembly 20 and are rigidly joined by a rear bottom angle 25a located at the rear bottom end of the vertical frame 25. A cross beam 21 is rigidly secured to the mid section of the base members 27. The cross beam 21 has brackets 21a that are rigidly secured and extending forward from its front surface. The bracket 21a supportably receives a pivot rod 21b. A second cross beam 22 is rigidly secured to the near forward section of the base members 27. The cross beam 22 has a bracket 23 secured and extending upward from its top face. A front mount is rigidly secured to front of each base member 27. Lip supports 24 are fixed to the front surface of each front mount 28.

The vertical frame 25 is comprised of risers 25c, rear bottom angle 25a, mounting angle brace 25d and riser brace 25b. The riser's 25c are rigidly secured to the base members 27 and the rear bottom angle 25a and to the hinge angle 26 to rigidly support the tubular hinge segments 13. The riser brace 25b is rigidly secured to the outer risers 25c and to the base members 27 and the remaining riser 25c and the hinge angle braces 25d are rigidly secured to the hinge angle 25a and the hinge angle 26.

The ramp assembly 10 is comprised of a ramp plate 14, a rear plate 15, a header plate 17, side plates 19, ramp hinge lugs 18, ramp beams 16 and a cross plate 12. The ramp assembly 10 is movable through a range of inclined positions about the rear hinge 13 affixed with hinge pin 11 to the supporting frame 20. The ramp assembly 10 is joined together with several beams 16 and side plates 19 to a rear plate 15 and header plate 17 and rigidly secured. The rear plate 15 is secured to the tubular hinge segments 13. Several ramp hinge lugs 18 are rigidly secured to the header plate 17. A cross plate 12 is secured to the underside of the ramp plate centered to the ramp assembly 10 and rear of the header plate 17.

The hydraulic cylinder 40 is comprised of essentially two sub-assemblies including a piston rod 41 and a cylindrical housing 42. The cylinder extends when fluid is supplied into the housing 42 through the fitting port 43. The fluid is supplied from the motor pump assembly 70 through a feed hose 71.

Figure 5:
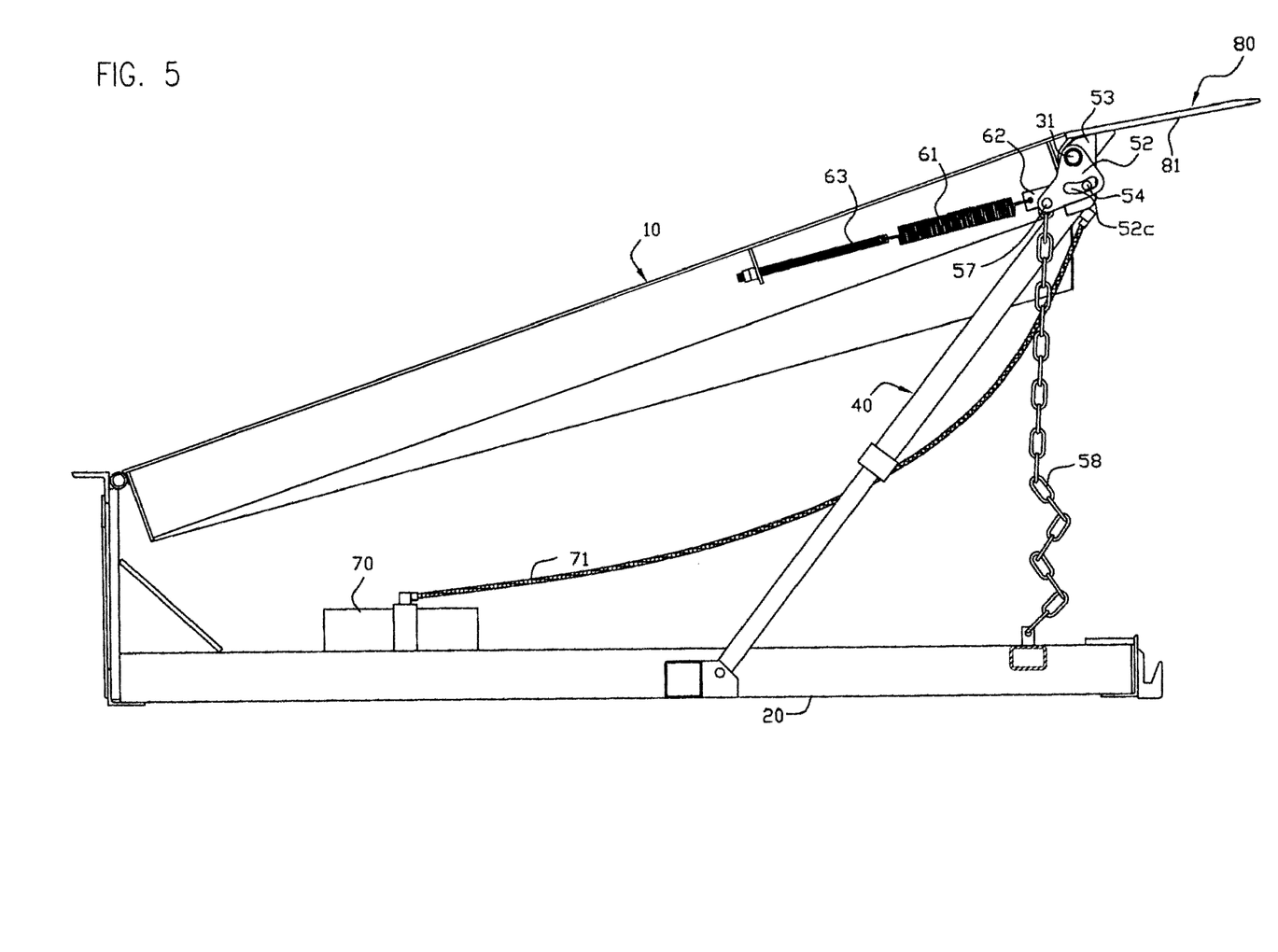
FIG. 5 is a side sectional view showing the ramp assembly in its upper most inclined position with the hydraulic cylinder and lip assembly fully extended.

The lip assembly 80 is comprised of a lip plate 81 that is rigidly secured to several incrementally spaced lip hinge lugs 82 so to equally and with sufficient clearance align with the ramp hinge lugs 18 when pivotally secured with the lip hinge pin 31. As shown in FIG. 1 the lip assembly 80 is supported by the lip supports 24 in its stored position and by means of the attachment to the ramp hinge lugs 18 support the ramp assembly 10 in the substantially horizontal stored position level with the building floor. The lip assembly 80 is the same width as the ramp plate 14 to effectively line up when pivoted into an extended position as shown in FIG. 5.

Figure 2:
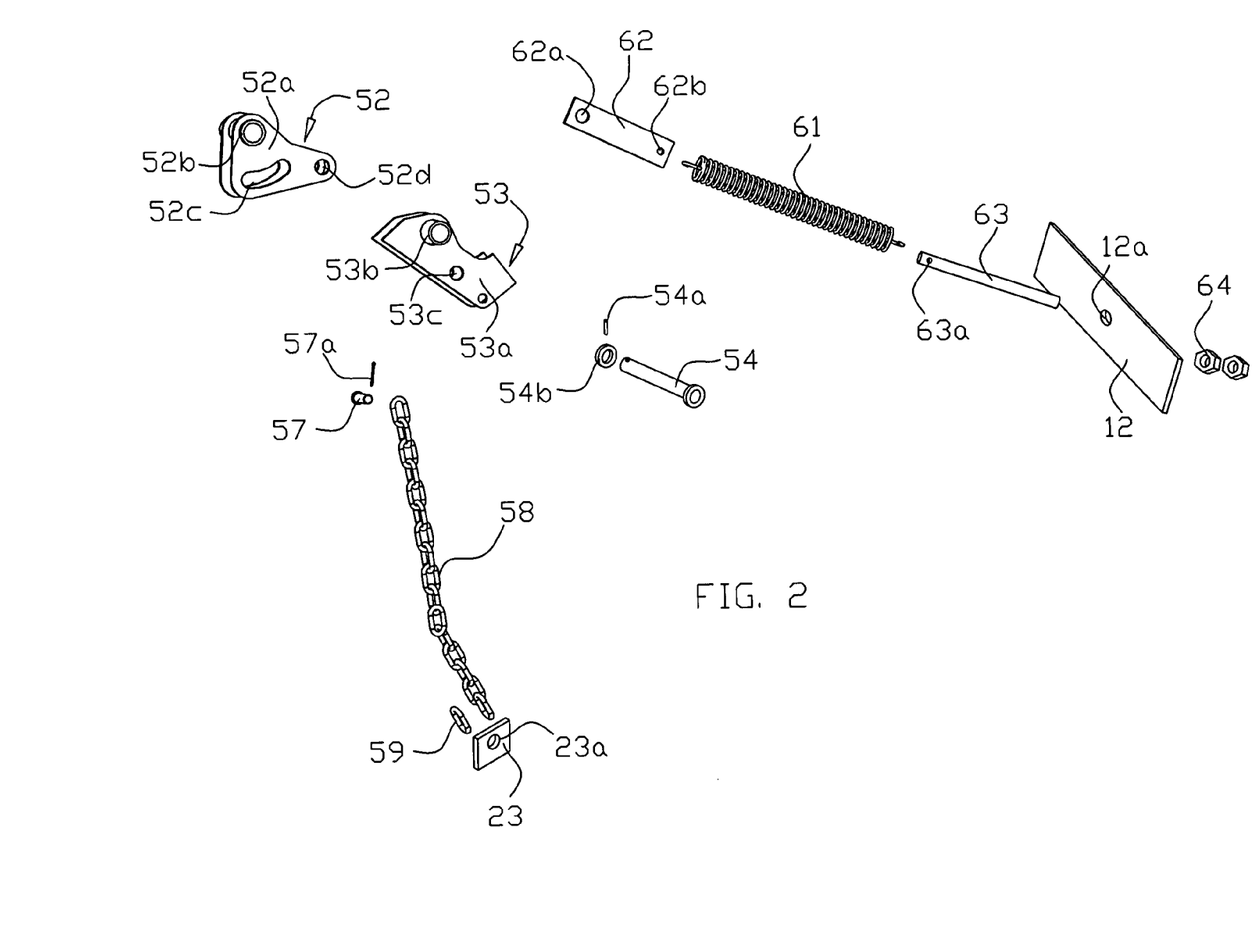
FIG. 2 is perspective exploded view of the components of the lip actuator mechanism.
Figure 3:
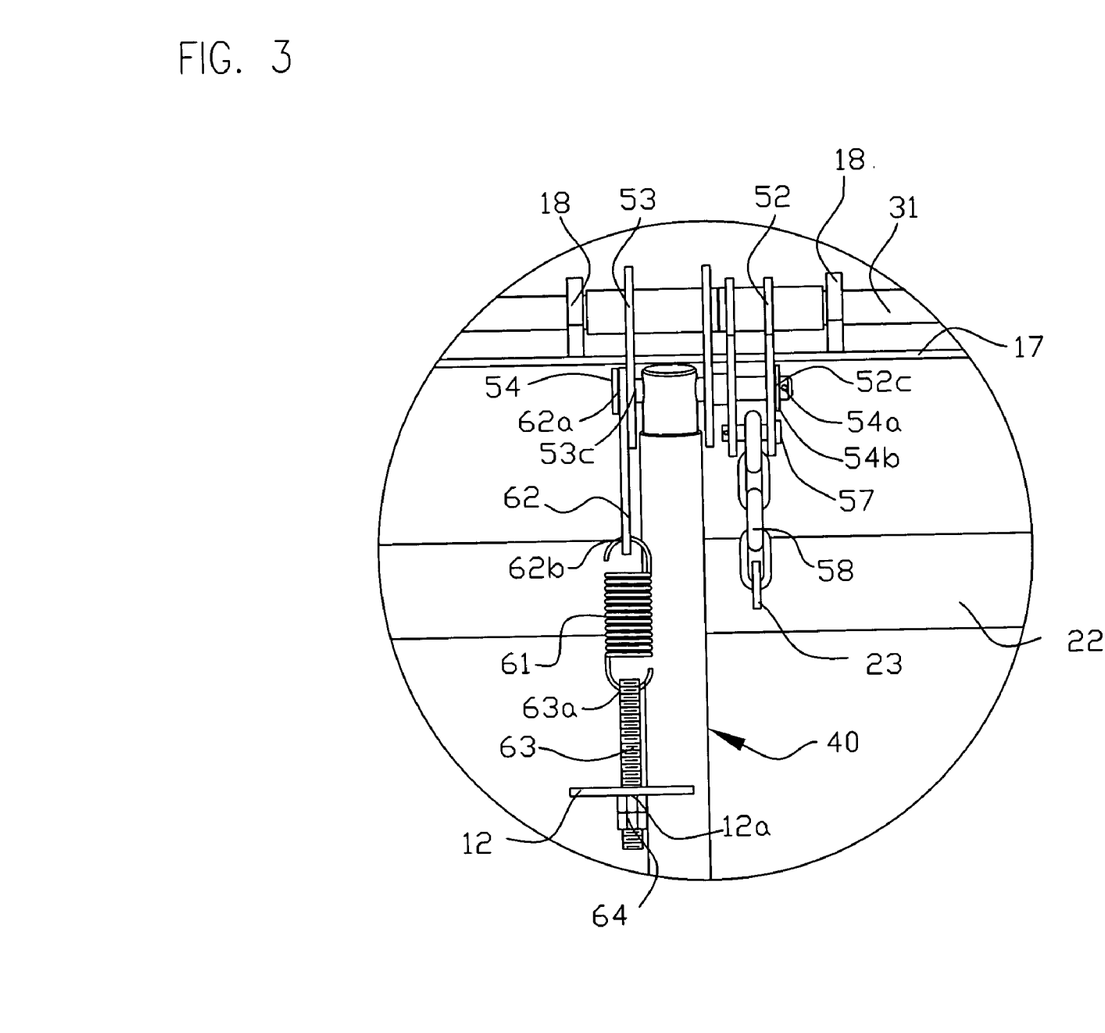
FIG. 3 is a top view with the ramp plate and lip assembly removed showing the assembled components of the lip actuator mechanism.

The lip actuator mechanism 50 is comprised of a variety of components best shown in FIGS. 2 and 3 including an actuator crank assembly 52, an extension crank assembly 53, an actuator chain 58, a return spring 61, pivot mount 62 an adjuster rod 63 and adjustment nuts 64. The actuator crank assembly 52 is comprised of two plates 52a spaced apart and connected to a tube 52b. The plates 52a are aligned with a slot 52c cut in them to accept an actuator pin 54 and a hole 52d to accept a pin 57 for attachment of the actuator chain 58. The opposite end of the actuator chain 58 is attached to a frame bracket 23 with a connector link through hole 23a. The extension crank assembly 53 is comprised of two plates 53a spaced apart and connected to a tube 53b. The plates are aligned with a hole 52d to accept a pin 54.

As shown in FIG. 3 the actuator crank assembly 52 and the extension crank assembly 53 are aligned between two ramp hinge lugs 18 and hingedly secured with the lip hinge rod 31. The actuator pin 54 passes through the hole 62a in the pivot mount 62, then through hole 53c in the extension crank 53, then through the slotted hole 52c in the actuator crank 52 and finally through retaining washer 54b and is secured with pin 54a. The return spring 61 is attached at one end to the pivot mount 62 through hole 62b and to the adjuster rod 63 through hole 63a at the opposite end. The adjuster rod 63 passes through bracket 12 at adjustment hole 12a and is fastened with nuts 64. The return spring 61 is adjusted to be in a predetermined tension at all times and to increase in tension when the extension crank assembly 53 rotates outward and away from bracket 12.

Figure 1A:
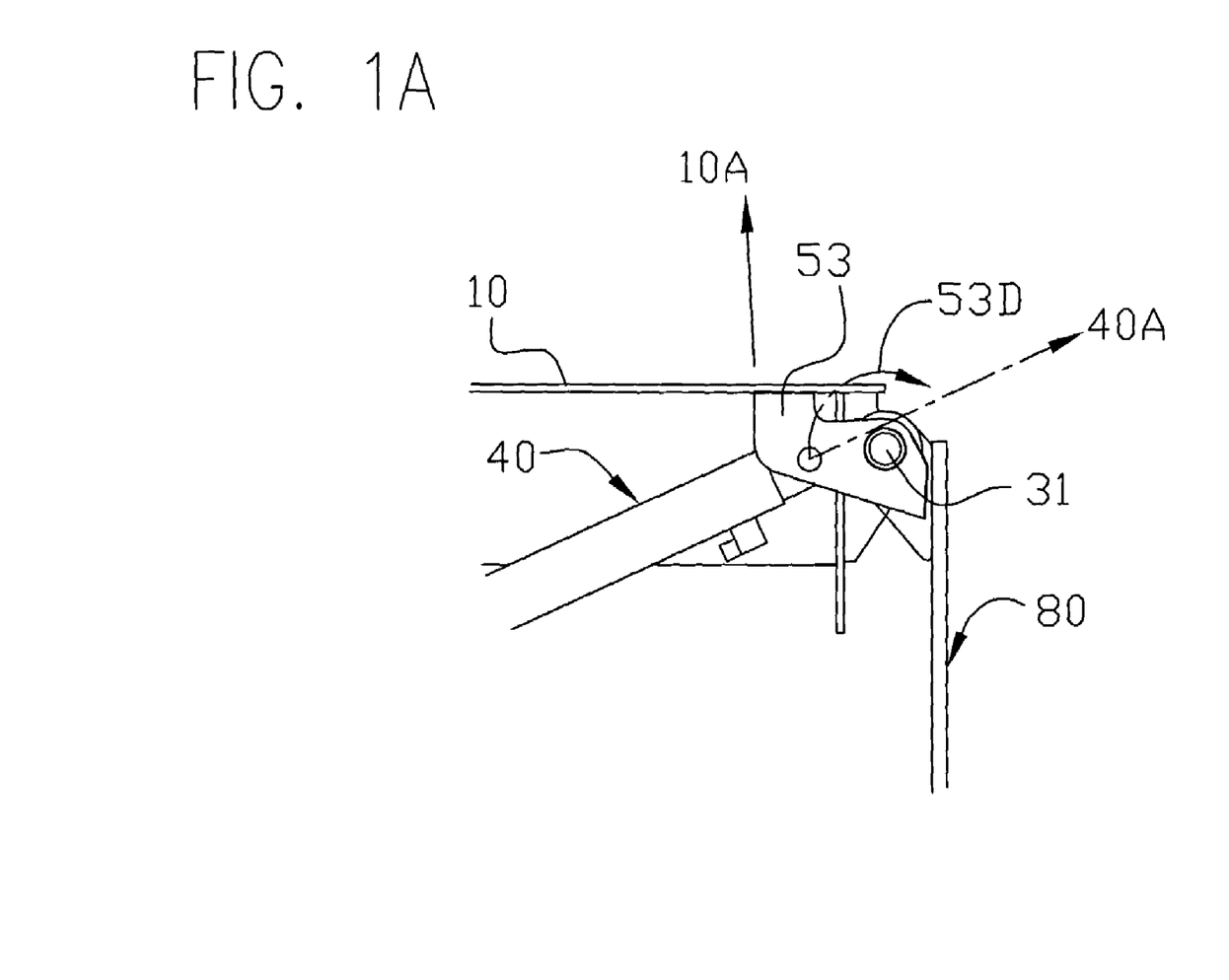
FIG. 1A is a side sectional view of the lip hinge area showing the direction of force applied by the upper hydraulic cylinder to the extension crank assembly and the resultant rotation of the crank and lifting of the ramp assembly from the dock leveler parked position.

When the dock leveler is in its parked position as in FIG. 1, the operator pushes a control button, not shown, that starts the motor pump 70 that supplies fluid to extend the hydraulic cylinder 40. The forces exerted on the extension crank assembly 53 are shown in FIG. 1A, where the direction of force is applied in a direction 40A resulting in a rotation 53D of the extension crank assembly 53 about hinge pin 31 so it makes firm contact with the underside of the ramp plate 14 thus causing the ramp assembly 10 to raise from its stored position.

Figure 4:
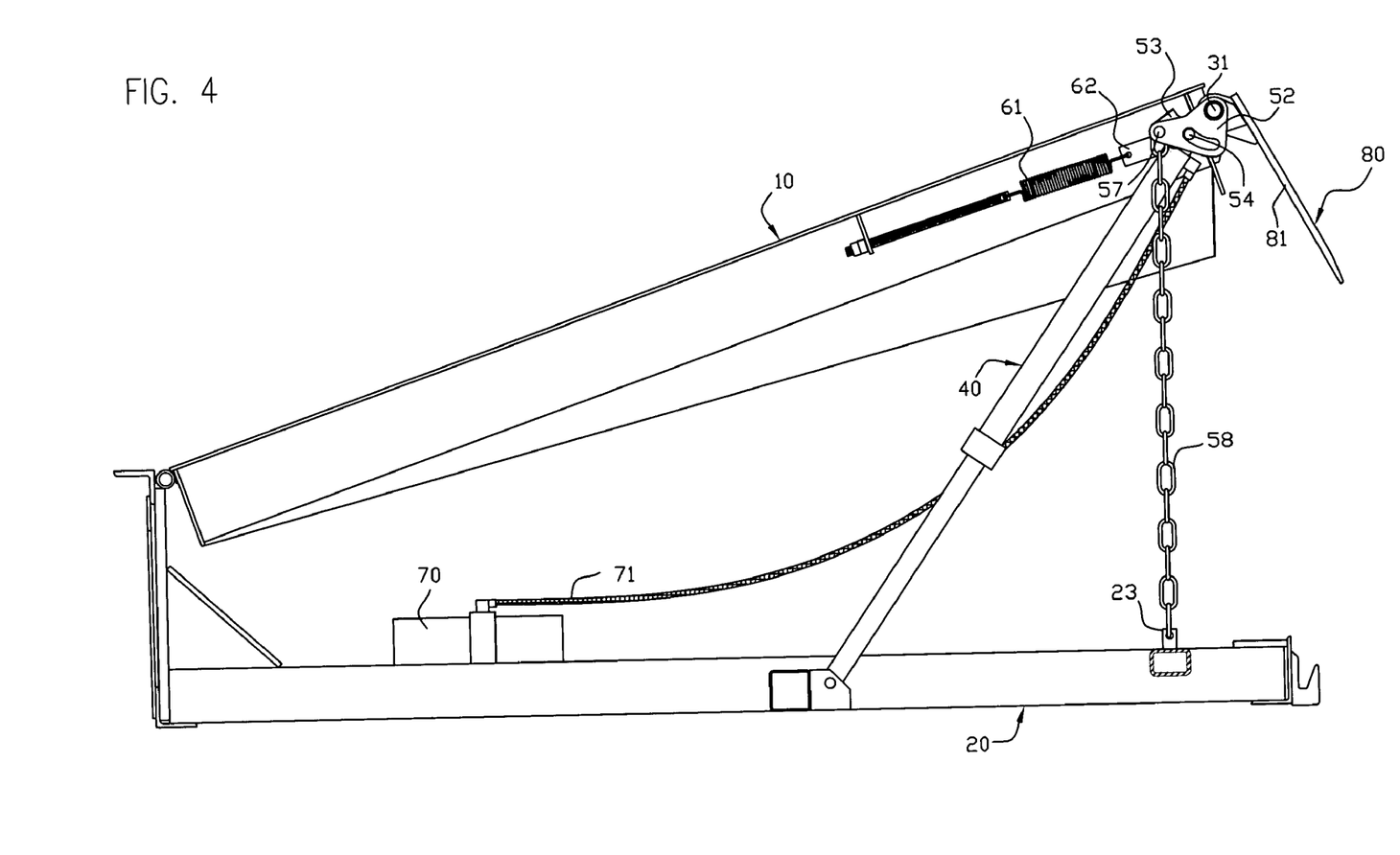
FIG. 4 is a side sectional view showing the ramp assembly having been raised to an upper inclined position where the actuator link is starting to rotate the actuator mechanism and extend the lip assembly.

FIG. 4 illustrates the initial lip extension position as the ramp assembly 10 continues to raise under the operators control. When the ramp assembly 10 nears its upper most inclined position the actuator chain 58 reaches its maximum length and tightens pulling substantially downwards on the actuator crank assembly 52 that in turn pulls down the extension crank assembly 53 by means of the common pin attachment 54. The extension crank assembly 53 in turn pivots around the hinge pin 31 making firm contact with the underside of the lip plate 81 causing the lip assembly 80 to rotate outward.

Figure 4A:
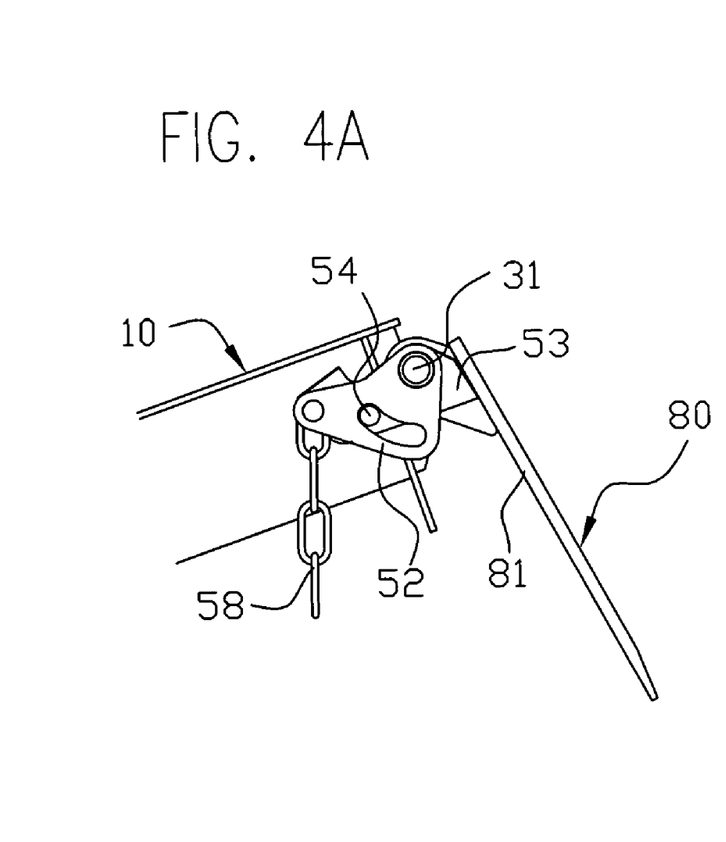
FIG. 4A is a side sectional view of the lip hinge showing the actuator crank extending the lip assembly.
Figure 4B:
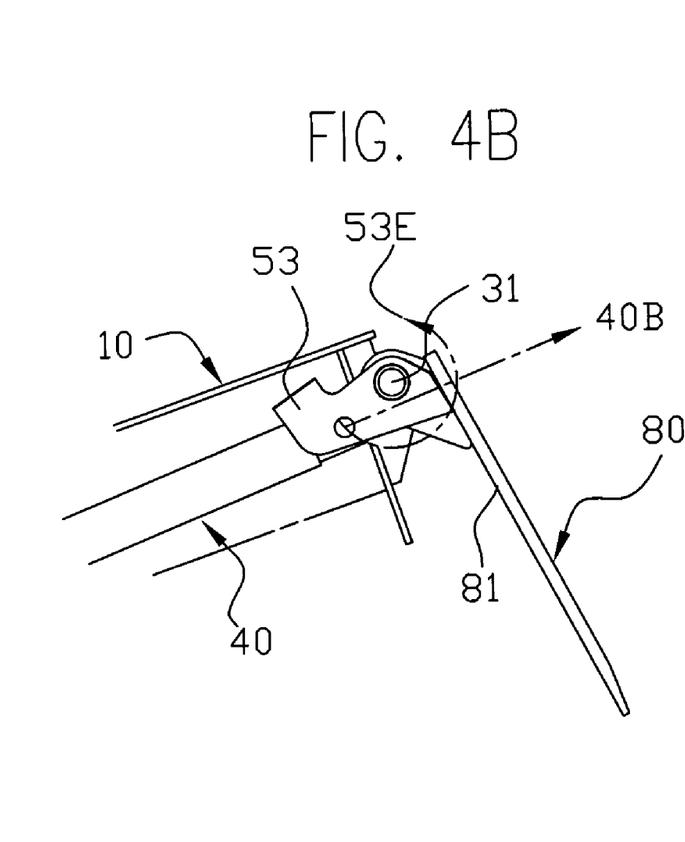
FIG. 4B is a side sectional view of the lip hinge showing the direction of force applied by the upper hydraulic cylinder to the extension crank assembly and the resultant rotation of the crank and extending of the lip assembly.
Figure 5A:
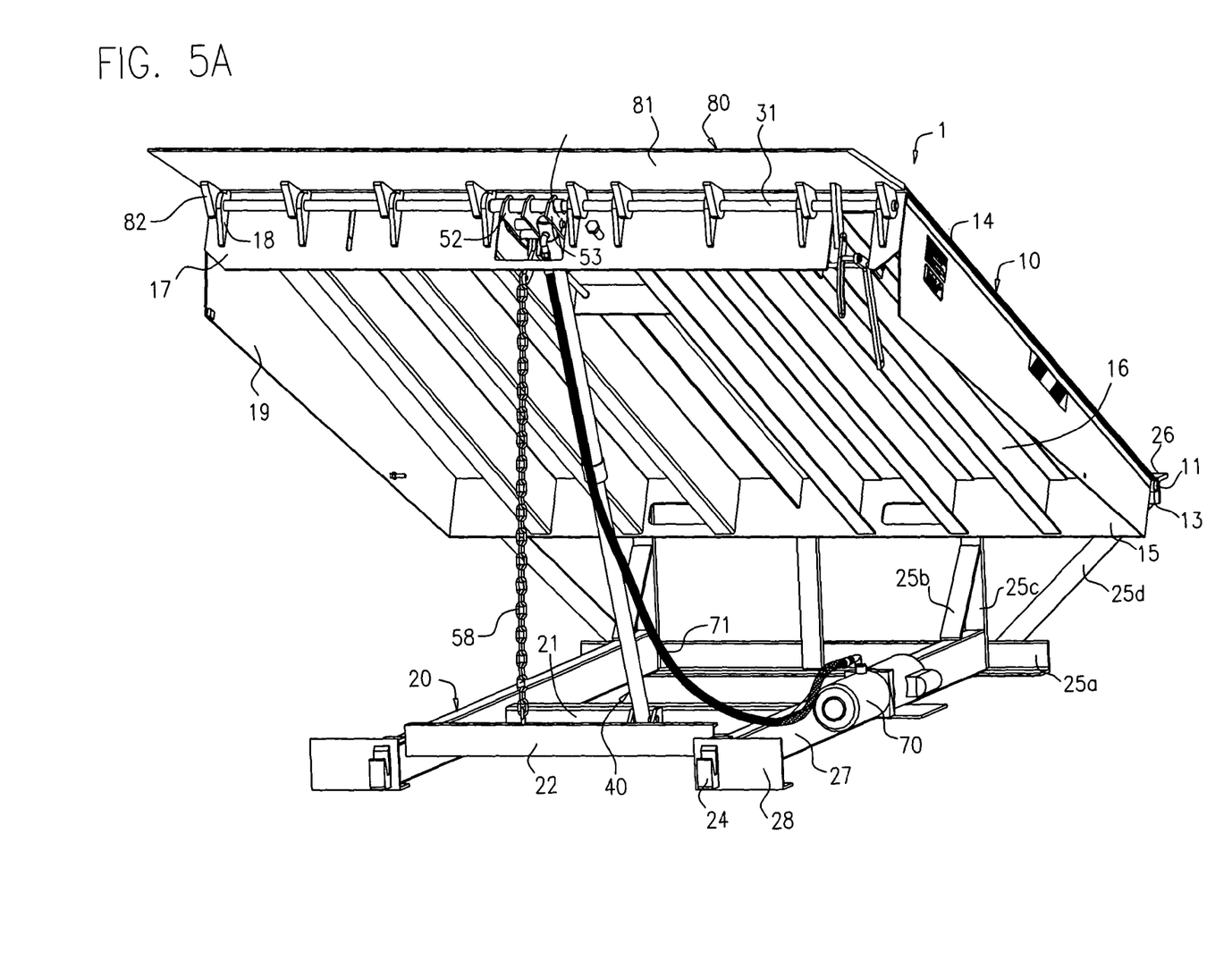
FIG. 5A is a perspective view of FIG. 5 showing the dock leveler in its fully raised and extended position.

The actuator crank assembly 52 continues to rotate the lip assembly until it reaches an over center position of hinge pin 31 as shown in FIGS. 4A and 4B, and then the hydraulic cylinder 40 will fully extend the lip assembly 80 until it abuts the ramp plate 14 as in FIGS. 5 and 5A. When the lip assembly 80 is fully extended the actuator crank assembly 52 and the actuator chain 58 become free of tension as the actuator pin 54 follows forward in slot 52C allowing the actuator crank assembly 52 to pivot downward effectively decreasing the distance to the bracket 23 allowing the actuator chain 58 to become slack. As the extension crank assembly 53 pivots forward around hinge pin 31 the pivot mount 62 also moves forward thus increasing tension on the return spring 61. The increased tension on the return spring 61 is not restrictive to the extension of the lip assembly 80 but is essential for the retraction mode when system pressure is removed. Once the lip is fully extended the operator releases the control button, not shown, allowing the ramp assembly 10 to lower. With the pump pressure removed from the system the hydraulic cylinder 40 will retract by the weight of the lip assembly 80 and the ramp assembly 10 sending fluid back to the motor pump assembly 70 until the lip plate 81 contacts the truck bed 90 as in FIG. 6.

Figure 6:
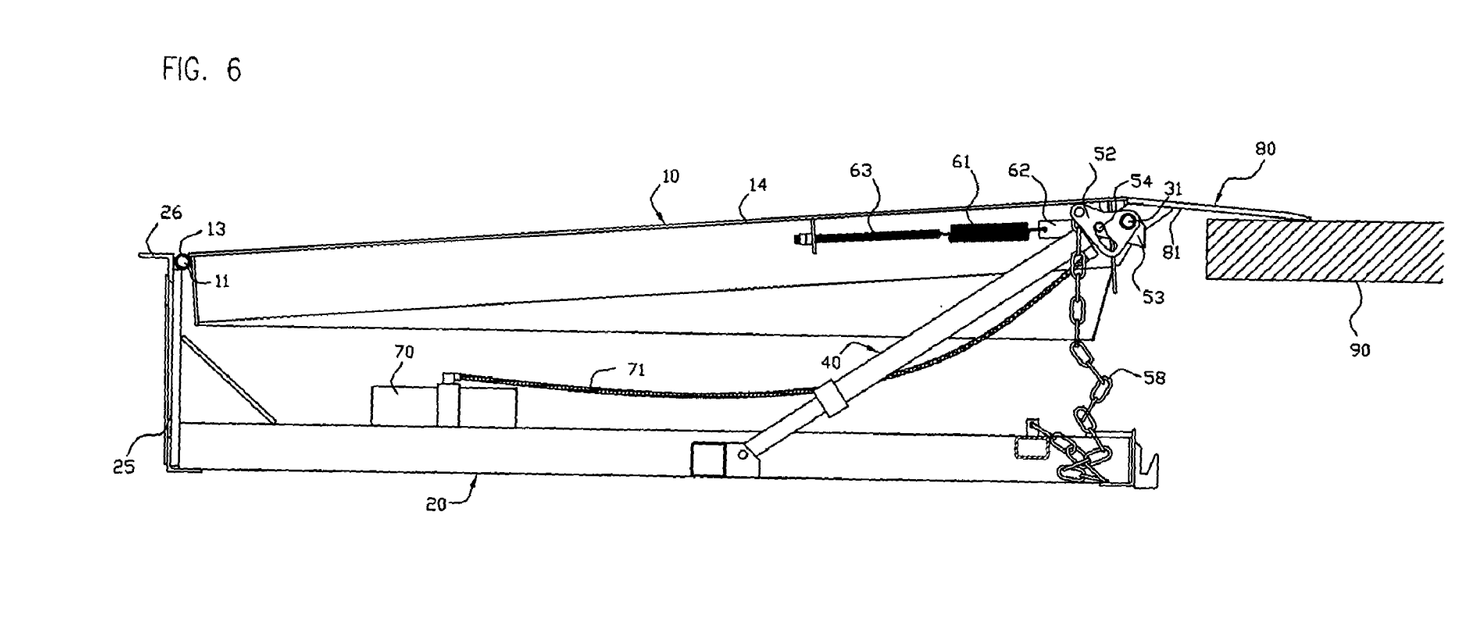
FIG. 6 is a side sectional view of the dock leveler with the lip assembly engaging the bed of a truck, the ramp assembly supported by the lip hinge and the frame with the lip actuator mechanism retracted in the lift mode position so that the lip can retract freely.

Referring to FIG. 6, the truck bed 90 and the rear vertical frame 25 now supports the entire weight of the ramp assembly 10 and the lip assembly 80 so that all applied fluid system pressure is removed. Once the system pressure is removed the return spring 61 pulls back on pin 54 by means of the pivot mount 62 thus retracting the hydraulic cylinder 40 and the extension crank assembly 53 until the crank assembly contacts the underside of the ramp plate 14. Pin 54 also retracts the actuator assembly 52 by engaging the rear of slot 52c while in its reverse rotation. This action returns the actuator mechanism 50 to the deck lift mode.

Figure 7:
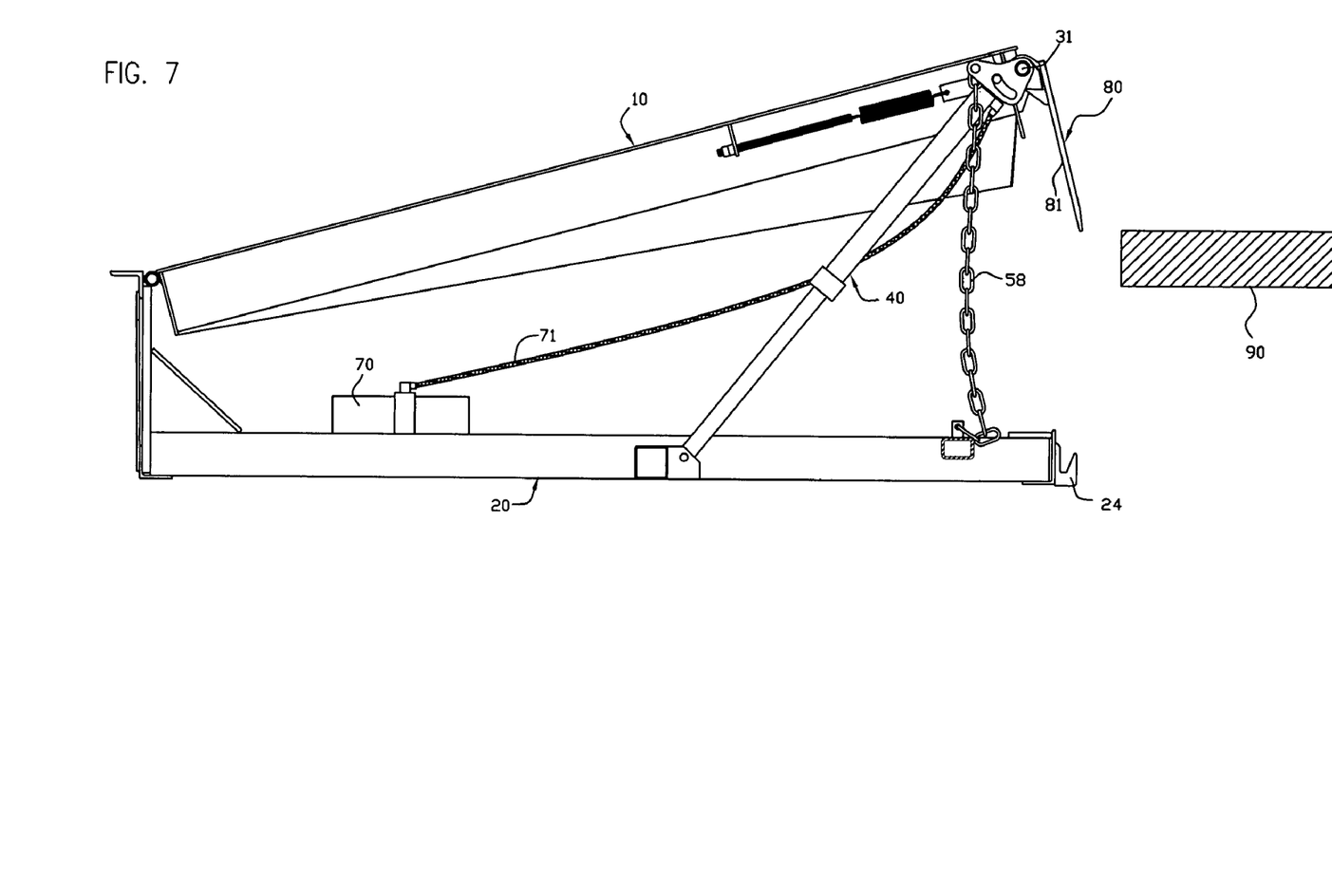
FIG. 7 is a side sectional view showing the ramp assembly in an inclined position with the lip assembly rotated pendant and free of the truck bed.

When the use of the dock leveler is complete the operator pushes the control button, not shown, to again provide fluid to the hydraulic cylinder and raise the ramp assembly 10. The lip assembly 80 is now free to rotate downward and retract from the truck bed 90 as in FIG. 7. When the lip plate 81 is free of the truck bed 90 and in its pendant position the operator releases the control button, not shown, and the ramp assembly 10 descends until the lip plate 81 contacts the lip supports 24 and again is in its horizontal parked position as in FIG. 1.

While the invention has been described with reference to a preferred embodiment, it will be understood by those skilled in the art that various changes may be made and equivalents may be substituted without departing from the broad aspects of the invention.

I claim:

1. A hydraulically operated dock leveler for forming a bridge between a floor of a loading dock and a truck bed, said dock leveler comprising:

a ramp assembly hinged at its rear edge to a supporting frame and movable through a range of raised and lowered inclined positions with a lip assembly hinged to the forward edge of the ramp assembly movable from a downward pendant position to an outwardly extended position;

a single hydraulic cylinder means connected to the supporting frame structure and to an actuator mechanism that when extending provides a force to lift said ramp assembly and extend said lip assembly;

said actuator mechanism connected to and rotational around the forward hinge to affect both the lifting of the said ramp assembly and extending of the said lip assembly thus providing two modes of operation, said actuator mechanism comprising an extension crank to apply direct ramp lifting and lip extending-mode positions, an actuator crank to initiate the lip extension mode when the said ramp assembly is rising near its upper inclined position, a link from said actuator mechanism to the supporting frame structure to initiate the lip extension, and a spring mechanism to retract the said hydraulic cylinder and said actuator assembly when hydraulic fluid pressure is not present; and a motor pump unit to provide fluid under pressure to extend the said hydraulic cylinder and to receive fluid when the cylinder retracts.

2. The dock leveler of claim 1, and wherein said hydraulic cylinder is connected to said extension crank and to said spring mechanism with a common pin so when the system is depressurized said cylinder and said crank will be positioned to the ramp lifting mode position by said spring mechanism.

3. The dock leveler of claim 1, and wherein said actuator mechanism, by means of the said actuator link, repositions said hydraulic cylinder nearing the end of its extension to change the position from a ramp lifting mode to a lip extending mode so that the final extension of the cylinder extends said lip assembly.

4. The dock leveler of claim 2, and wherein said extension crank and said actuator crank are connected by said common pin where said actuator crank can be free and disconnected from said extension crank when said lip assembly is extended.

5. The dock leveler of claim 4, and wherein said extension crank is connected and disconnected from the actuator crank by means of a pin rotating within a slot.

6. The dock leveler of claim 3, and wherein the cylinder after extending the lip holds the ramp in its inclined position by means of the actuator mechanism.

7. The dock leveler of claim 3, and wherein after the lip extension is initiated the actuator link is no longer under tension.

8. The dock leveler of claim 4, and wherein the retraction spring is further tensioned when the actuator mechanism is extended.

9. The dock leveler of claim 1, and wherein when the system delivery pressure is removed the weight of the ramp assembly will retract the hydraulic cylinder allowing said ramp assembly to lower.

10. The dock leveler of claim 9, and wherein when said ramp assembly reaches full descent the flow of oil will retract said lip assembly.

11. The dock leveler of claim 1, and wherein said actuator mechanism pivots around the lip hinge in a two-component configuration.

12. The dock leveler of claim 11, and wherein the first component actuates the second component to initiate extension of the lip.

13. The dock leveler of claim 11, and wherein the second component actuates the first component when said actuator mechanism retracts.

14. The dock leveler of claim 11, and wherein the first component disconnects from the second component when the lip extends.

15. The dock leveler of claim 2, and wherein the lip is free to rotate downward when the cylinder is in lift mode position with the actuator mechanism retracted.

16. The dock leveler of claim 1, and wherein said retraction spring tension is adjustable.

* * * * *